(12) United States Patent
Rittner et al.

(10) Patent No.: US 12,037,240 B2
(45) Date of Patent: Jul. 16, 2024

(54) AIRCRAFT OCCUPANT CHEMICAL OXYGEN SYSTEM WITH SHORT AND LONG DURATION

(71) Applicant: AVOX Systems Inc., Lancaster, NY (US)

(72) Inventors: Wolfgang Rittner, Ahrensboek (DE); Etienne Tomasena, Luebeck (DE); Ruediger Meckes, Berkenthin (DE); Andreas Westphal, Eutin (DE); Herbert Meier, Luebeck (DE); Jeroen Van Schaik, Paris (FR); Sumit Gogna, Williamsville, NY (US)

(73) Assignee: AVOX SYSTEMS INC., Lancaster, NY (US)

( * ) Notice: Subject to any disclaimer, the term of this patent is extended or adjusted under 35 U.S.C. 154(b) by 0 days.

(21) Appl. No.: 18/128,046

(22) Filed: Mar. 29, 2023

(65) Prior Publication Data
US 2023/0249972 A1    Aug. 10, 2023

Related U.S. Application Data

(62) Division of application No. 16/959,427, filed as application No. PCT/US2019/015502 on Jan. 29, 2019, now abandoned.
(Continued)

(51) Int. Cl.
| | |
|---|---|
| *C01B 13/02* | (2006.01) |
| *A62B 7/08* | (2006.01) |
| *A62B 7/14* | (2006.01) |

(52) U.S. Cl.
CPC ............ *C01B 13/0296* (2013.01); *A62B 7/08* (2013.01); *A62B 7/14* (2013.01); *C01B 13/0203* (2013.01)

(58) Field of Classification Search
None
See application file for complete search history.

(56) References Cited

U.S. PATENT DOCUMENTS

| 3,207,695 A | 9/1965 | Gustafson |
| 3,293,187 A | 12/1966 | Markowitz |
| (Continued) | | |

FOREIGN PATENT DOCUMENTS

| JP | 08333101 A | 12/1996 |
| JP | 0912302 A | 1/1997 |
| (Continued) | | |

OTHER PUBLICATIONS

U.S. Appl. No. 16/959,427, Non-Final Office Action, Oct. 26, 2022, 13 pages.
(Continued)

*Primary Examiner* — Joseph D Anthony
(74) *Attorney, Agent, or Firm* — Kilpatrick Townsend & Stockton LLP

(57) ABSTRACT

A chemical oxygen core for a chemical oxygen generator includes at least one layer of an oxygen-generating composition. In some examples, the at least one layer comprises includes a metal powder fuel, a transition metal oxide catalyst, and an oxygen source. In various examples, the at least one layer includes less than approximately 0.1 percent by weight of the transition metal oxide catalyst. In certain examples, a chemical oxygen generator includes a chemical oxygen core and a perforated metal covering surrounding the chemical oxygen core along a length of the chemical oxygen core. In some aspects, the perforated metal covering has an opening ratio of approximately 0 to 100 percent.

16 Claims, 5 Drawing Sheets

Related U.S. Application Data

(60) Provisional application No. 62/623,669, filed on Jan. 30, 2018.

(56) References Cited

U.S. PATENT DOCUMENTS

| | | | |
|---|---|---|---|
| 3,516,797 A * | 6/1970 | Bovard | C01B 13/0296 |
| | | | 422/166 |
| 3,542,522 A | 11/1970 | Mausteller | |
| 3,742,683 A * | 7/1973 | Sebest | B01J 7/00 |
| | | | 96/372 |
| 4,197,213 A | 4/1980 | Pietz et al. | |
| 5,298,187 A | 3/1994 | Zhang et al. | |
| 6,054,067 A | 4/2000 | Zhang et al. | |
| 6,866,794 B1 | 3/2005 | Zhang et al. | |
| 9,732,071 B2 | 8/2017 | Patron et al. | |
| 2004/0151639 A1 * | 8/2004 | Jones | A62B 21/00 |
| | | | 422/305 |
| 2005/0287224 A1 | 12/2005 | Rho | |
| 2008/0185556 A1 | 8/2008 | Noble | |
| 2013/0192596 A1 | 8/2013 | Rittner et al. | |
| 2014/0241961 A1 * | 8/2014 | Maroske | A62B 7/08 |
| | | | 422/650 |
| 2016/0194203 A1 | 7/2016 | Ernst et al. | |
| 2017/0107104 A1 | 4/2017 | Kallfass et al. | |

FOREIGN PATENT DOCUMENTS

| | | |
|---|---|---|
| JP | 09301701 A | 11/1997 |
| JP | 2000510804 A | 8/2000 |
| WO | 2008094490 A1 | 8/2008 |
| WO | 2009030921 A2 | 3/2009 |

OTHER PUBLICATIONS

Brazilian Patent Application No. BR112020013432-5, Office Action, Mar. 14, 2023, 4 pages.
European Patent Application No. EP19705001.6, Office Action, Dec. 21, 2021, 3 pages.
European Patent Application No. EP19705001.6, Office Action, Sep. 20, 2021, 3 pages.
Japanese Patent Application No. JP2020-541703, Office Action, Jan. 24, 2023, 10 pages.
International Application No. PCT/US2019/015502, International Preliminary Report on Patentability, Aug. 13, 2020, 10 pages.
International Application No. PCT/US2019/015502, International Search Report and Written Opinion, Jul. 5, 2019, 15 pages.
International Application No. PCT/US2019/015502, Invitation to Pay Additional Fees and, Where Applicable, Protest Fee, May 9, 2019, 9 pages.
Chinese Application No. 201980010614.9, Office Action mailed on Jan. 3, 2023, 14 pages (8 pages of original document and 6 pages of English translation).
European Application No. 19705001.6, Office Action mailed on Feb. 21, 2023, 4 pages.
Chinese Application No. 201980010614.9, Office Action mailed on Jul. 19, 2023, 11 pages (7 pages original document, 4 pages English translation).
Chinese Application No. 201980010614.9, Office Action, mailed on Mar. 6, 2024, 8 pages (5 pages of original document and 3 pages of English Summary).
European Application No. 23209411.0, Extended European Search Report, mailed on Feb. 19, 2024, 6 pages.
Japanese Application No. 2023-063984, Office Action, mailed on Apr. 30, 2024, 15 pages (7 pages of original document, 8 pages of English translation).

* cited by examiner

AIRCRAFT OCCUPANT CHEMICAL OXYGEN SYSTEM WITH SHORT AND LONG DURATION

REFERENCE TO RELATED APPLICATIONS

This application is a division of U.S. patent application Ser. No. 16/959,427, filed Jun. 30, 2020, and entitled AIRCRAFT OCCUPANT CHEMICAL OXYGEN SYSTEM WITH SHORT AND LONG DURATION, which application is a national stage application of International Application No. PCT/US2019/015502, filed Jan. 29, 2019, and entitled AIRCRAFT OCCUPANT CHEMICAL OXYGEN SYSTEM WITH SHORT AND LONG DURATION, which application claims the benefit of U.S. Provisional Application No. 62/623,669, filed Jan. 30, 2018, and entitled AIRCRAFT OCCUPANT CHEMICAL OXYGEN SYSTEM WITH SHORT AND LONG DURATION, the content of all of which are hereby incorporated by reference in their entireties.

FIELD OF THE INVENTION

This application relates to chemical oxygen generator systems, and more particularly to chemical oxygen generator systems with oxygen supply for short and long duration.

BACKGROUND

Oxygen sources for production and provision of breathable oxygen are generally used in a variety of applications and industries, including but not limited to aircraft, breathing apparatus for firefighters and mine rescue crews and the like, submarines, and any application where a compact emergency oxygen generator is needed. Oxygen can be produced in many different ways. In cases of emergencies in aircrafts, aircraft passengers need to be supplied with emergency oxygen in order to be protected from pressure drops of the aircraft cabin pressure. The emergency oxygen may be provided by chemical oxygen generators, where the oxygen is generated by high-temperature decomposition of a chemical oxygen core.

A problem associated with such chemical oxygen generators is that in addition to composition of the chemical oxygen core, external environmental influences like cabin pressure, vibrations, and cabin temperature may significantly influence the speed of the chemical reaction, which may result in too much or too little oxygen being produced in the chemical oxygen generator. Particularly in an emergency situation the cabin temperature and cabin pressure may significantly vary, which may affect the speed of the chemical reaction and the amount of oxygen produced per time unit. For example, a chemical oxygen core at an increased temperature may produce oxygen for a shorter duration of time compared to a chemical oxygen core at a decreased temperature, while the chemical oxygen core at the decreased temperature may have a decreased oxygen flow compared to the chemical oxygen core at the increased temperature. As another example, a chemical oxygen core subjected to increased vibrations may have a reduced oxygen flow compared to a chemical core subjected to decreased vibrations. Further, the speed of the chemical reaction and thus the amount of oxygen produced per time unit may depend on the age of the chemical oxygen core and further depend on manufacturing effects of the chemical oxygen core. Such effects may further influence the amount of oxygen produced per time unit in the chemical reaction.

All these internal and external effects may adversely affect the oxygen production and result in insufficient delivery of oxygen or insufficient delivery time of oxygen. Therefore, there is a need for a chemical oxygen generator that produces a sufficient amount of oxygen at different environmental conditions with the required oxygen flow, duration, and breathing gas purity.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a chemical oxygen core for a chemical oxygen generator includes at least one layer of an oxygen-generating composition. In some examples, the at least one layer includes a metal powder fuel, a transition metal oxide catalyst, and an oxygen source. In various aspects, the at least one layer includes less than approximately 0.1 percent by weight of the transition metal oxide catalyst. The chemical oxygen core is configured to produce breathable oxygen gas upon thermal decomposition of the chemical oxygen core.

In some cases, the at least one layer includes approximately 0.0 to 5.0 percent by weight of the metal powder fuel. In certain aspects, the metal powder fuel is selected from the group consisting of iron, cobalt, and combinations thereof. In various examples, the at least one layer includes approximately 3.4 to 3.9 percent by weight of the metal powder fuel. According to some examples, the at least one layer further includes an additive, and the additive is selected from the group consisting of feldspar, anhydrous aluminum silicate, and combinations thereof.

In various aspects, the oxygen source is selected from the group consisting of alkali metal chlorates, alkali metal perchlorates, and combinations thereof. In certain examples, the at least one layer further includes a binder selected from the group consisting of amorphous silicon dioxide, mica, and combinations thereof. In various cases, the at least one layer further includes a reaction moderator selected from the group consisting of potassium permanganate, potassium hydroxide, mica, amorphous silicon dioxide, and combinations thereof. In certain aspects, the at least one layer comprises approximately 0.0 to 0.1 percent by weight of the transition metal oxide catalyst.

According to some examples, a chemical oxygen generator includes a chemical oxygen core and a perforated metal covering surrounding the chemical oxygen core along a length of the chemical oxygen core. In certain cases, the perforated metal covering includes an opening ratio of approximately 0 to 100 percent. In some cases, the perforated metal covering includes an opening ratio of approximately 0 to 60 percent. In various aspects, the perforated metal covering surrounds and supports the chemical oxygen core to prevent damage and separation of the material during operation and non-operation of the generator.

In various examples, the chemical oxygen generator further includes a housing having an ignition end, an outlet end, and a housing cavity where the chemical oxygen core and perforated metal covering are positioned within the housing cavity. In various aspects, the ignition end includes an ignition system configured to ignite the chemical oxygen core, and the outlet end is configured to direct oxygen out of the chemical oxygen generator. In some cases, the perforated metal covering includes a stepwise, linear, or polynomic-functional increasing opening ratio along the length of the chemical oxygen core. In certain examples, the perforated metal covering is selected from the group consisting of a nickel-chrome alloy, stainless steel, and combinations thereof.

In certain aspects, the chemical oxygen generator further includes a liner surrounding the perforated metal covering along the length of the chemical oxygen core. In some examples, the liner is a cylindrical metal liner. In various aspects, the liner is conical metal liner. In various examples, the perforated metal covering includes at least one end portion and a body portion adjacent to the at least one end portion, and the at least one end portion includes an opening ratio that is less than the opening ratio of the body portion. In certain cases, the at least one end portion comprises an opening ratio of 0 percent, meaning that the end portion has no openings. In some cases, the at least one end portion includes two end portions, and the body portion is between the two end portions.

In various cases, the chemical oxygen core includes at least one layer of an oxygen-generating composition, and the at least one layer includes a metal powder fuel, a transition metal oxide catalyst, and an oxygen source. In certain examples, the at least one layer comprises less than approximately 0.1 percent by weight of the transition metal oxide catalyst. In various examples, the at least one layer comprises approximately 0.0 to 5.0 percent by weight of the metal powder fuel. In some aspects, the at least one layer comprises approximately 0.0 to 0.1 percent by weight of the transition metal oxide catalyst.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
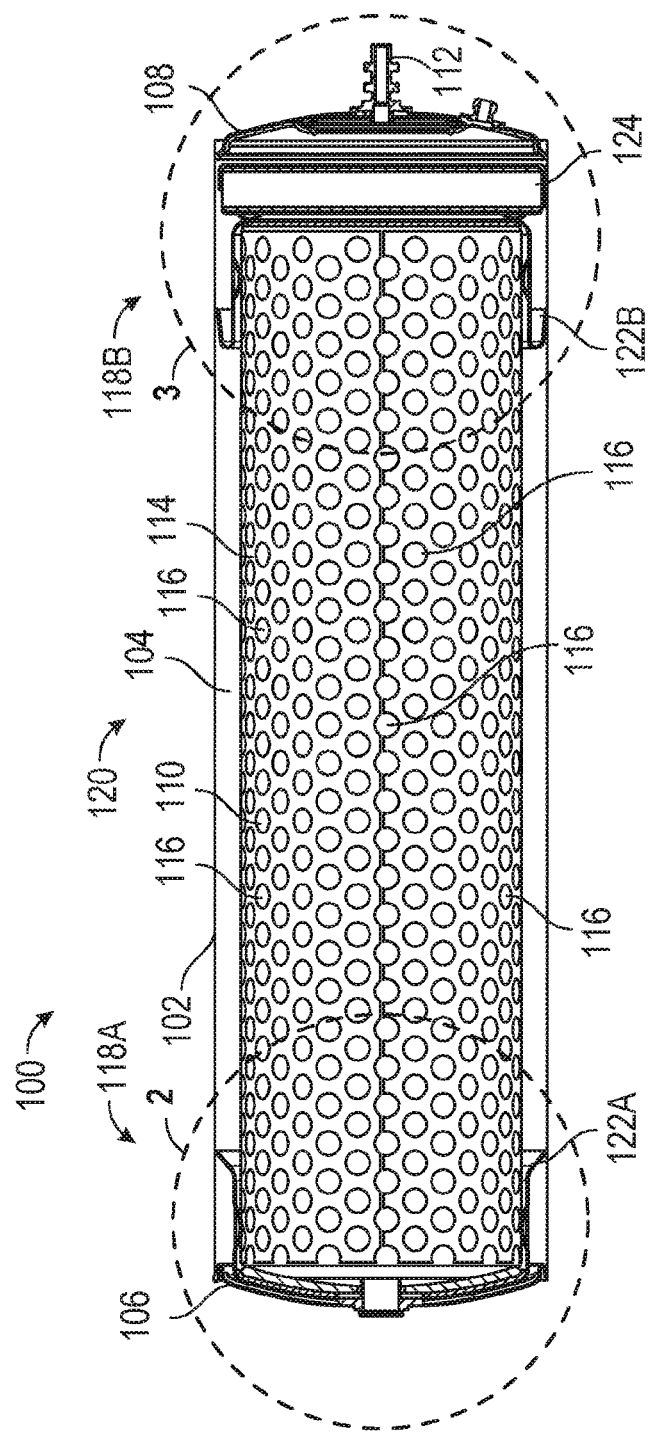
FIG. 1 is a side view of a chemical oxygen generator according to aspects of the current disclosure with a housing of the chemical oxygen generator shown as a section such that the interior of the chemical oxygen generator is visible.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," and "back," among others are intended to refer to the orientation as illustrated and described in the figure (or figures) to which the components and directions are referencing. References herein to "consisting of" may, in at least some circumstances, encompass "consisting essentially of" or "comprising."

In some aspects, disclosed is a chemical oxygen core that includes compositions capable of generating oxygen for a chemical oxygen generator upon thermal decomposition of the chemical oxygen core. In one examples, the composition includes a metal fuel, a transition metal oxide catalyst, and an oxygen source. In some examples, the amount of the transition metal oxide catalyst is minimized or eliminated and the amount of metal fuel is controlled. In various examples, the chemical oxygen core includes less than approximately 0.1% by weight of the transition metal oxide catalyst.

It was unexpectedly found that by controlling the amount of metal fuel and minimizing and/or eliminating the amount of transition metal oxide catalyst, the burn front temperature (i.e., the temperature of the portion of the chemical oxygen core undergoing thermal decomposition) was increased. By increasing the burn front temperature, it was unexpectedly found that the difference between the flow and duration of oxygen at higher temperatures and the flow and duration of oxygen at lower temperatures was minimized. In other words, the chemical oxygen core was less sensitive to temperature effects.

In various aspects, also disclosed is a chemical oxygen generator having a chemical oxygen core and a perforated metal covering surrounding the chemical oxygen core. In some examples, the perforated metal covering has an opening ratio of approximately 0% to 100%. In various aspects, perforated metal covering includes an opening ratio of approximately 0% to 60%. In certain aspects, the perforated metal covering reduces the heat transfer to the outside of the core (i.e., between the mesh and the housing of the chemical oxygen generator) and therefore increases the burn front temperature. In some examples, the perforated metal covering also provides structural stability to the chemical oxygen core such that the influence of vibrations or other physical conditions on the production and flow of oxygen is minimized.

In various examples, a chemical oxygen core includes at least one layer of an oxygen-generating composition. In some examples, the at least one layer includes a metal fuel, a transition metal oxide catalyst, and an oxygen source. In certain examples, the composition optionally includes binder(s) and/or additive(s).

In various aspects, the metal fuel is a metal powder that is provided as fuel to furnish the heat necessary to help sustain the decomposition reaction. In certain cases, the metal powder fuel may include iron, cobalt, various other suitable metal powder fuels, or combinations thereof. In one non-limiting examples, the metal powder fuel includes iron. In some aspects, the chemical oxygen core includes approximately 0.0% to 15.0% by weight of the metal powder fuel. In various examples, the chemical oxygen core includes approximately 0.0% to 5.0% by weight of the metal powder fuel. In some non-limiting examples, the composition includes approximately 3.4% to 3.9% by weight of the metal powder fuel. In one non-limiting example, the composition includes approximately 3.4% by weight of the metal powder fuel. In another non-limiting example, the composition includes approximately 3.6% by weight of the metal powder fuel. In a further non-limiting example, the composition includes approximately 3.9% by weight of the metal powder fuel.

In some examples, the transition metal oxide catalyst is used to facilitate decomposition. In various examples, the transition metal oxide catalyst includes cobalt oxides (e.g., $CO_3O_4$), magnesium oxides (e.g., $MnO_2$, $Mn_2O_3$, $Mn_3O_4$), iron oxides (e.g., $Fe_2O_3$), sodium oxide ($Na_2O$), combinations thereof, or various other suitable catalysts. In certain aspects, the composition includes less than approximately 0.1% by weight of the transition metal catalyst. In some examples, the composition includes approximately 0.0% to 0.1% by weight of the transition metal catalyst. In one non-limiting example, the composition includes 0.0% by weight of the transition metal catalyst (i.e., the transition metal catalyst is excluded/not present in the composition). As previously described, it was unexpectedly found that by controlling the amount of metal fuel and minimizing and/or eliminating the amount of transition metal oxide catalyst, the burn front temperature was increased, and the difference between the flow and duration of oxygen at higher temperatures and the flow and duration of oxygen at lower temperatures was minimized. In other words, the chemical oxygen core with such a composition of metal fuel and transition metal oxide catalyst was less sensitive to temperature effects.

In various aspects, the oxygen source is an alkali metal chlorate, alkali metal perchlorate, various other suitable oxygen source material, or combinations thereof. In one non-limiting example, the oxygen source is sodium chlorate.

Inert ceramic oxides such as glass powders, glass fibers, and other suitable material may be provided as binders to help hold the composition together before and after decomposition or reaction moderators to modify decomposition rates and/or promote uniform oxygen generation. In some examples, the binders may include amorphous silicon dioxide, mica, various other suitable binders, or combinations thereof. In various examples, the reaction moderator includes potassium permanganate, potassium hydroxide, mica, amorphous silicon dioxide, various other suitable reaction moderators, or combinations thereof.

In various examples, additives may be added to the composition for various purposes including, but not limited to, lowering chlorine gas formation, reaction rate control, etc. In some examples, the additive may include feldspar, anhydrous aluminum silicate, various other additives, or combinations thereof. In some examples, anhydrous aluminum silicate may improve reaction rate control compared to equal amounts of other similar inert inorganic additives. In certain examples, compositions with feldspar may have reduced or lower chlorine gas formation.

Figure 2:
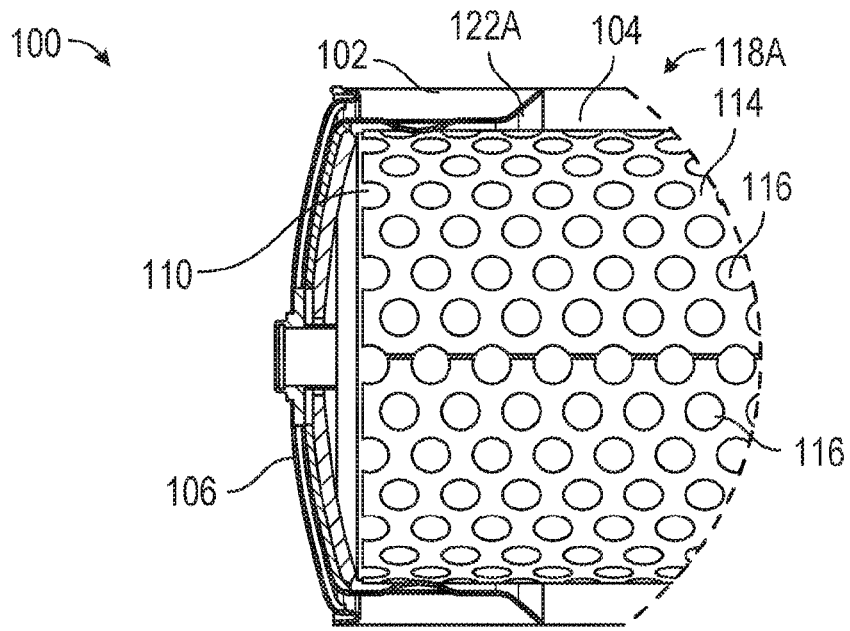
FIG. 2 is a side view of a portion of the chemical oxygen generator of FIG. 1 taken from detail circle 2 in FIG. 1.
Figure 3:
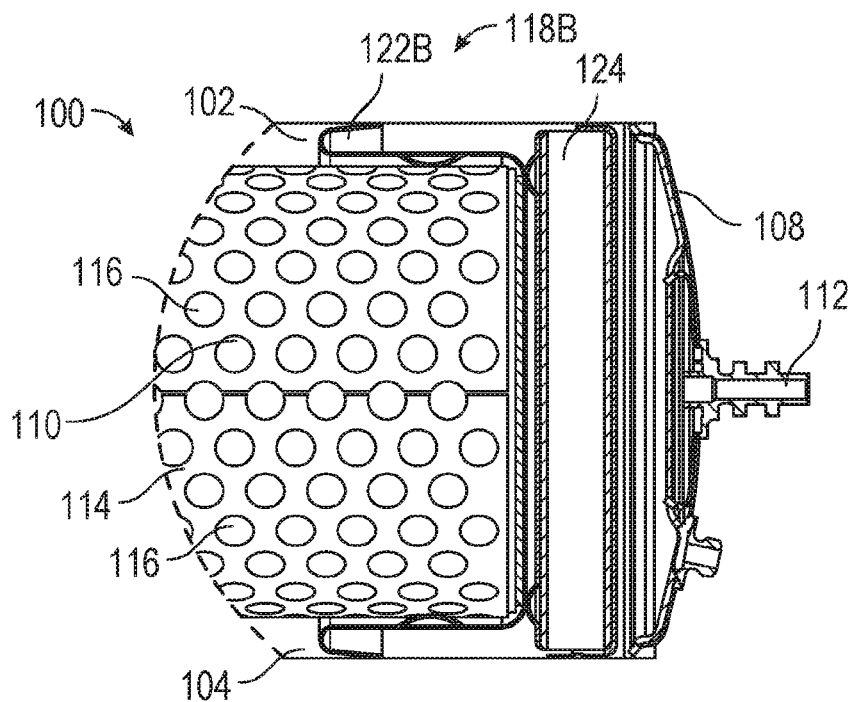
FIG. 3 is a side view of a portion of the chemical oxygen generator of FIG. 1 taken from detail circle 3 in FIG. 1.
Figure 6:
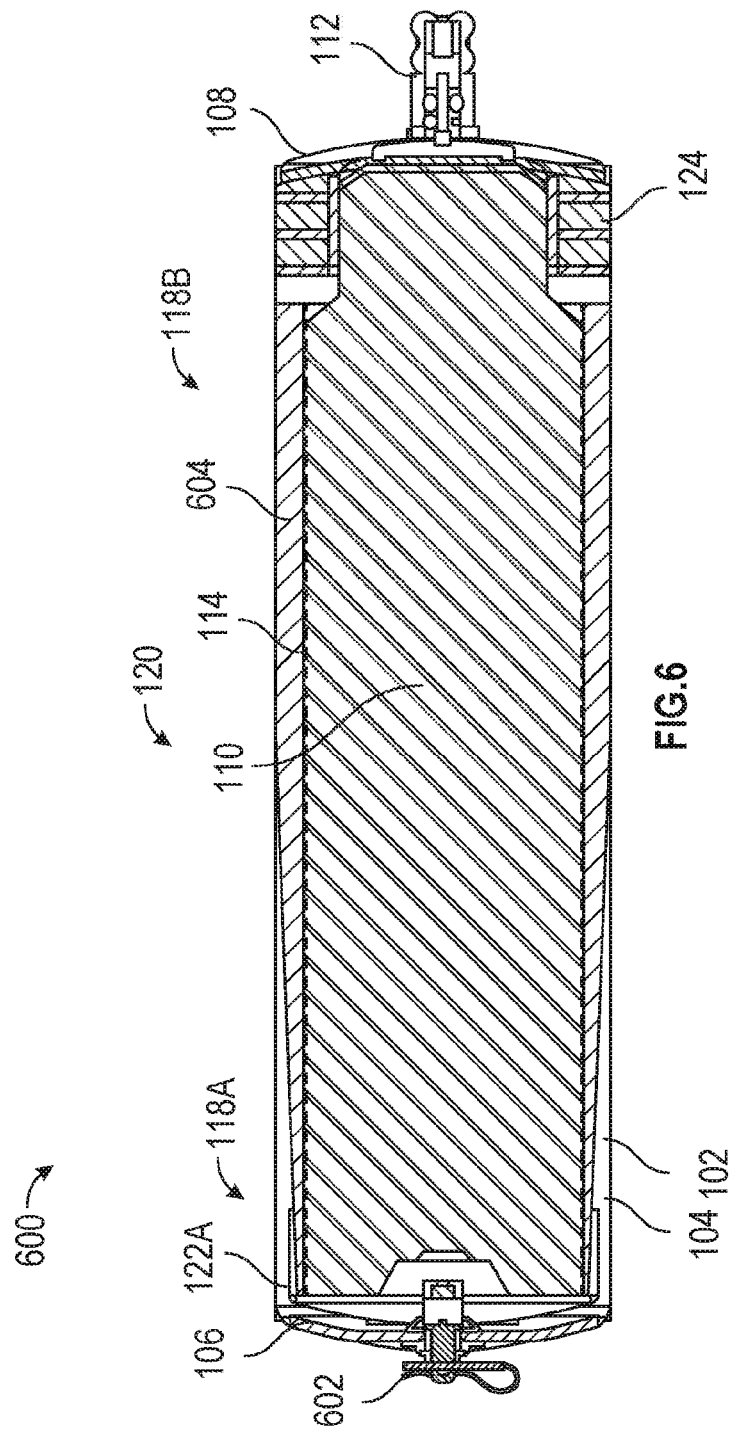
FIG. 6 is a sectional view of a chemical oxygen generator according to aspects of the present disclosure.

FIGS. 1-3 illustrate an example of a chemical oxygen generator 100 according to aspects of the current disclosure. In certain examples, the chemical oxygen generator 100 includes a housing 102 defining a housing cavity 104. A chemical oxygen core 110 is positioned within the housing cavity 104. The housing 102 also includes an ignition end 106 and an outlet end 108. In various examples, the ignition end 106 includes an ignition system (see, e.g., ignition system 602 in FIG. 6) that is configured to ignite the chemical oxygen core 110 and start the chemical reaction that produces oxygen. The ignition system may be triggered in various circumstances, such as by a passenger pulling an oxygen supply mask from a passenger service unit. In some examples and as illustrated in FIG. 6, the ignition system 602 includes a spring, firing plunger, and primer cap. In other examples, various other ignition systems suitable for igniting the chemical oxygen core 110 may be utilized. The outlet end 108 is configured to direct oxygen out of the chemical oxygen generator 100 as it is generated by the chemical oxygen core 110. In some examples, a manifold 112 or other suitable outlet is provided at the outlet end 108 such that the chemical oxygen generator 100 is in fluid communication with one or more oxygen masks through the manifold 112.

The chemical oxygen core 110 may include a composition similar to the composition described above (e.g., less than approximately 0.1% by weight of the transition metal catalyst and the controlled amount of metal powder fuel) or may have various other suitable compositions. In the present example, the chemical oxygen core 110 includes less than approximately 0.1% by weight of the transition metal catalyst and the controlled amount of metal powder fuel as previously described.

Figure 4:
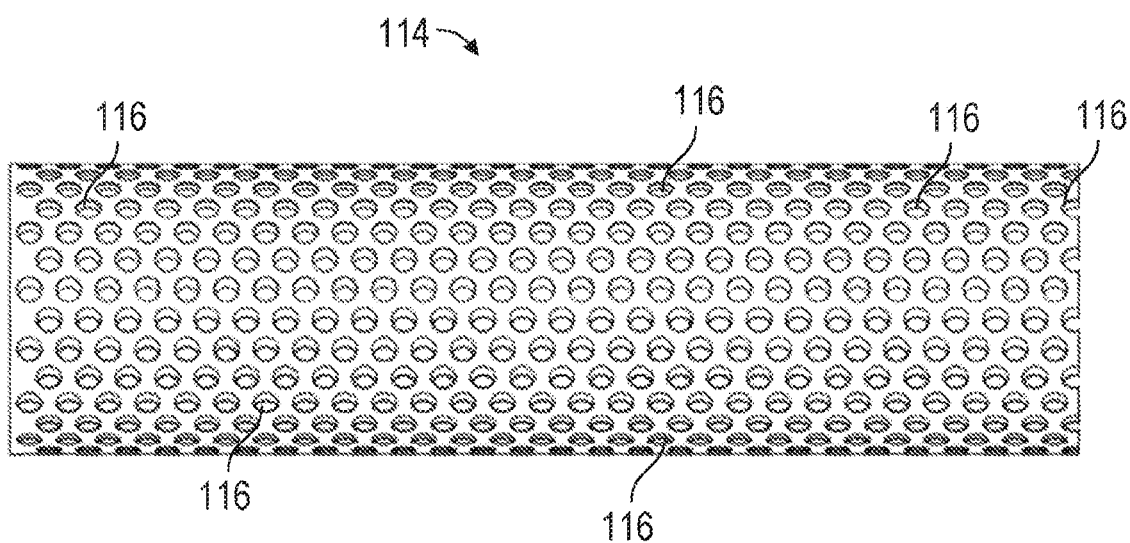
FIG. 4 is a side view of a perforated covering of the chemical oxygen generator of FIG. 1.
Figure 5:
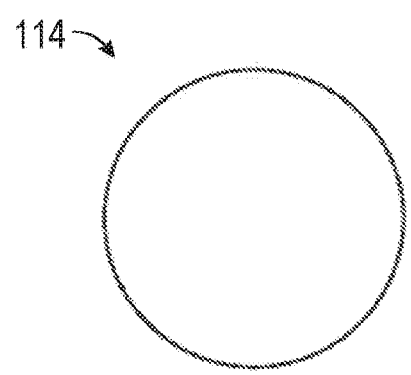
FIG. 5 is an end view of the perforated covering of FIG. 4.

As illustrated in FIGS. 1, 4, and 5, a perforated metal covering 114 having a plurality of openings 116 surrounds the chemical oxygen core 110. In various aspects, the perforated metal covering 114 surrounds and supports the chemical oxygen core 110 to minimize or prevent damage and separation of the material during operation and non-operation of the generator. In some aspects, the perforated metal covering 114 surrounds the chemical oxygen core 110 along a length of the chemical oxygen core 110. In various examples, the perforated metal covering 114 is mesh, a perforated metal sheet, or other similar structure with a plurality of openings 116 and surrounding the chemical oxygen core 110. In some examples, the perforated metal covering 114 includes a nickel-chrome alloy, stainless steel (e.g., AISI 304 or other suitable stainless steel), copper, brass, monel, bronze, nickel, CrNiMoTi-alloys, various other suitable metals, or combinations thereof. In certain examples, the perforated metal covering 114 has a heat conductivity that heats up the non-reacted chemical oxygen core 110, which may lead to preheating of the chemical oxygen core 110. The perforated metal covering 114 may further have a heat conductivity that reduces the heat at the reaction zone of the chemical oxygen core 110 during oxygen generation, thus slowing down the reaction and reducing oxygen flow, which increases the duration of the reaction forming oxygen.

In certain examples, the perforated metal covering 114 has an opening ratio of 0% to 100%. In some cases, the perforated metal covering 114 has an opening ratio of 0% to 60%. In various aspects, the opening ratio may depend on the type or shape of the openings 116. As one non-limiting example, a perforated metal covering 114 having concentric or oval openings 116 may have an opening ratio of 0% to 91%, although it need not in other examples. As another non-limiting example, a perforated metal covering 114 having rectangular openings 116 may have an opening ratio of 0% to 100%. As a further non-limiting example, a wire mesh perforated metal covering 114 may have an opening ratio of 0% to 100%. In various cases, the opening ratio changes (increases, decreases, other patterns, etc.) from one end of the perforated metal covering 114 to an opposite end of the perforated metal covering 114 (e.g., from proximate the ignition end 106 to proximate the outlet end 108). In other words, the percentage of the perforate metal covering 114 that is open along a length of the perforated metal covering 114 may change (increase, decrease, etc.) from one end to another. In some examples, the opening ratio increases in a stepwise pattern, a linear pattern, a polynomic-functional pattern, or various other suitable patterns. As mentioned, the openings 116 may have various suitable shapes as desired, including, but not limited to, concentric shapes, ovals, rectangles, other free-forms, stars, asterisk, combinations thereof, or various other suitable shapes. In various examples, the perforated metal covering 114 may allow reduce or prevent the ejection of undesirable salt dust (that is formed during decomposition of the core 110) from the core reaction zone. In some cases, by reducing the ejection of the salt dust, the perforated metal covering 114 may reduce or prevent an undesirable heat transfer from the salt dust to the generator housing, which can create undesirable high surface temperatures on the generator housing.

In certain aspects, the perforated metal covering 114 includes an end portion 118 proximate to one of the ends 106, 108 of the chemical oxygen core 110 and a body portion 120 adjacent to the end portion. In various examples, the end portion 118 extends a predetermined distance from the particular end 106 or 108. In some cases, the end portion 118 extends from about 0 inches to about 2 inches from the particular end 106 or 108; however, in various other examples, the end portion may extend various other predetermined distances from the end of the chemical oxygen core 110. In certain examples, the perforated metal covering 114 includes two end portions 118A-B (one adjacent to each end 106, 108 of the chemical oxygen core 110), and the body portion 120 is between the two end portions 118A-B. In some examples, each end portion 118A-B have an opening ratio that is less than the opening ratio of the body portion 210. In one non-limiting example, each end portion 118A-B has an opening ratio of 0%.

According to various examples, each opening 116 has a maximum diameter such that the molten chemical oxygen core 110 does not drip through the openings 116 at maximum g-forces of 0 g to 15 g. In some cases, the melting of the chemical oxygen core may depend on the viscosity in each particular chemical mix.

Through the perforated metal covering 114, heat transfer to the outside (i.e., between the perforated metal covering 114 and the housing 102) is reduced, and heat generated by the chemical oxygen core 110 is retained which in turn increases the burn front temperature. In addition, the perforated metal covering 114 provides additional support and stability to the chemical oxygen core 110 such that the impact of vibrations or other physical influences on the chemical oxygen core 110 is minimized.

As illustrated in FIGS. 1-3, in various examples, the chemical oxygen generator 100 optionally includes various components in addition to the housing 102, chemical oxygen core 110, and perforated metal covering 114. In some examples, baffles 122A-B are provided in the housing cavity 104 to further position the perforated metal covering 114 and/or chemical oxygen core 110 within the housing cavity 104. In various examples, a filter 124 is provided with the chemical oxygen generator 100 (optionally within the housing cavity 104) to filter the breathable gas generated by the chemical oxygen core 110 before it is delivered to the user of the chemical oxygen generator. In some examples, various types of insulation including, but not limited to, vermiculite, may be provided around the perforated metal covering 114.

FIG. 6 illustrates another example of a chemical oxygen generator 600. The chemical oxygen generator 600 is substantially similar to the chemical oxygen generator 100 except that the chemical oxygen generator further includes a metal liner 604 provided around the perforated metal covering 114. In some examples, the metal liner 604 may be conical (as illustrated in FIG. 6), cylindrical, or have various other suitable shapes. In various aspects, the metal liner 604 is constructed from various materials including, but not limited to, nickel, stainless steel, copper, brass, monel, bronze, CrNiMoTi-alloys, combinations thereof, or various other suitable materials. In some non-limiting examples, vermiculite (or other suitable insulation) may be provided around the metal liner 604. In certain cases, a porous insulator as mentioned above, air, or other suitable material may be provided between the core with the covering 114 and the liner 604. The metal liner 604 may be provided along various portions of the covering 114 as desired. For example, the metal liner 604 may cover 0% to 100% of the length of the covering 114, may extend from one end of the covering 114 to the other end, may be provided at discrete locations or sections along the length of the core, etc. In various aspects, the liner 604 may further direct oxygen flow and may provide further heat management.

Figure 7:
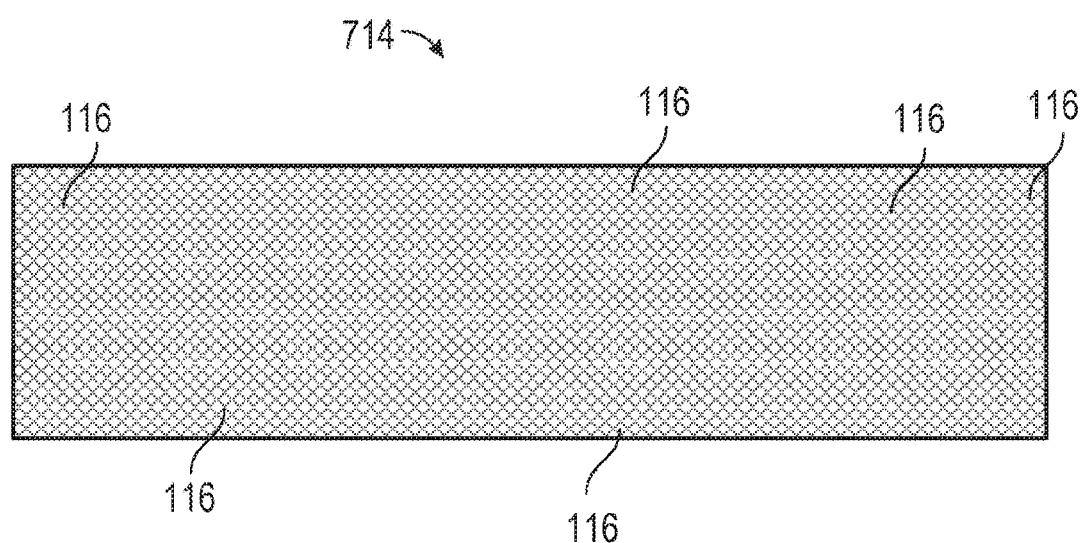
FIG. 7 is a side view of a perforate covering for a chemical oxygen generator according to aspects of the current disclosure.

FIG. 7 illustrates another perforated metal covering 714 that is substantially similar to the perforated metal covering 114 except that the perforated metal covering 714 is a wire mesh. As illustrated in FIG. 7, the wire mesh defines at least one opening 116 and has an opening ratio of 0% to 100%.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A chemical oxygen core for a chemical oxygen generator comprising: at least one layer of an oxygen-generating composition, wherein the at least one layer comprises: a metal powder fuel; a transition metal oxide catalyst; and an oxygen source, wherein the at least one layer comprises less than approximately 0.1 percent by weight of the transition metal oxide catalyst, and wherein the chemical oxygen core is configured to produce breathable oxygen gas upon thermal decomposition of the chemical oxygen core.

EC 2. The chemical oxygen core of any of the preceding or subsequent example combinations, wherein the at least one layer comprises approximately 0.0 to 5.0 percent by weight of the metal powder fuel.

EC 3. The chemical oxygen core of any of the preceding or subsequent example combinations, wherein the metal powder fuel is selected from the group consisting of iron, cobalt, and combinations thereof.

EC 4. The chemical oxygen core of any of the preceding or subsequent example combinations, wherein the at least one layer comprises approximately 3.4 to 3.9 percent by weight of the metal powder fuel.

EC 5. The chemical oxygen core of any of the preceding or subsequent example combinations, wherein the at least one layer further comprises an additive, and wherein the additive is selected from the group consisting of feldspar, anhydrous aluminum silicate, and combinations thereof.

EC 6. The chemical oxygen core of any of the preceding or subsequent example combinations, wherein the oxygen source is selected from the group consisting of alkali metal chlorates, alkali metal perchlorates, and combinations thereof, wherein the at least one layer further comprises a binder selected from the group consisting of amorphous silicon dioxide, mica, and combinations thereof and a reaction moderator selected from the group consisting of potassium permanganate, potassium hydroxide, mica, amorphous silicon dioxide, and combinations thereof.

EC 7. The chemical oxygen core of any of the preceding or subsequent example combinations, wherein the at least one layer comprises approximately 0.0 to 0.1 percent by weight of the transition metal oxide catalyst.

EC 8. A chemical oxygen generator comprising: a chemical oxygen core; and a perforated metal covering surrounding the chemical oxygen core along a length of the chemical oxygen core, wherein the perforated metal covering comprises an opening ratio of approximately 0 to 100 percent. In some cases, the perforated metal covering includes an opening ratio of approximately 0 to 100 percent.

EC 9. The chemical oxygen generator of any of the preceding or subsequent example combinations, further comprising a housing having an ignition end, an outlet end, and a housing cavity, wherein the chemical oxygen core and perforated metal covering are positioned within the housing cavity, wherein the ignition end comprises an ignition system configured to ignite the chemical oxygen core, and wherein the outlet end is configured to direct oxygen out of the chemical oxygen generator.

EC 10. The chemical oxygen generator of any of the preceding or subsequent example combinations, wherein the perforated metal covering comprises a stepwise, linear, or polynomic-functional increasing opening ratio along the length of the chemical oxygen core.

EC 11. The chemical oxygen generator of any of the preceding or subsequent example combinations, wherein the perforated metal covering is selected from the group consisting of a nickel-chrome alloy, stainless steel, and combinations thereof.

EC 12. The chemical oxygen generator of any of the preceding or subsequent example combinations, further comprising a liner surrounding the perforated metal covering along the length of the chemical oxygen core.

EC 13. The chemical oxygen generator of any of the preceding or subsequent example combinations, wherein the liner is a cylindrical metal liner.

EC 14. The chemical oxygen generator of any of the preceding or subsequent example combinations, wherein the liner is conical metal liner.

EC 15. The chemical oxygen generator of any of the preceding or subsequent example combinations, wherein the perforated metal covering comprises at least one end portion and a body portion adjacent to the at least one end portion, and wherein the at least one end portion comprises an opening ratio that is less than the opening ratio of the body portion.

EC 16. The chemical oxygen generator of any of the preceding or subsequent example combinations, wherein the at least one end portion comprises an opening ratio of 0 percent.

EC 17. The chemical oxygen generator of any of the preceding or subsequent example combinations, wherein the at least one end portion comprises two end portions, and wherein the body portion is between the two end portions.

EC 18. The chemical oxygen generator of any of the preceding or subsequent example combinations, wherein the chemical oxygen core comprises at least one layer of an oxygen-generating composition, and wherein the at least one layer comprises: a metal powder fuel; a transition metal oxide catalyst; and an oxygen source, wherein the at least one layer comprises less than approximately 0.1 percent by weight of the transition metal oxide catalyst.

EC 19. The chemical oxygen generator of any of the preceding or subsequent example combinations, wherein the at least one layer comprises approximately 0.0 to 5.0 percent by weight of the metal powder fuel.

EC 20. The chemical oxygen generator of any of the preceding or subsequent example combinations, wherein the at least one layer comprises approximately 0.0 to 0.1 percent by weight of the transition metal oxide catalyst.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A chemical oxygen generator comprising:
   a chemical oxygen core including at least one layer of an oxygen-generating composition, the at least one layer comprising:
   a metal powder fuel; and
   an oxygen source;
   a perforated metal covering surrounding the chemical oxygen core along a length of the chemical oxygen core, wherein the perforated metal covering comprises an opening ratio of approximately 1 percent to 99 percent;
   a housing having an ignition end, an outlet end, and a housing cavity, wherein the chemical oxygen core and perforated metal covering are positioned within the housing cavity, wherein the chemical oxygen core and perforated metal covering are positioned within the housing, wherein the ignition end comprises an ignition system configured to ignite the chemical oxygen core, and wherein the outlet end is configured to direct oxygen out of the chemical oxygen generator; and a liner surrounding the perforated metal covering along the length of the chemical oxygen core, wherein the liner is a conical metal liner, and wherein the chemical oxygen core is configured to produce breathable oxygen gas upon thermal decomposition of the chemical oxygen core.

2. The chemical oxygen generator of claim 1, wherein the at least one layer of the oxygen-generating composition comprises less than approximately 5.0 percent by weight of the metal powder fuel.

3. The chemical oxygen generator of claim 2, wherein the metal powder fuel comprises iron and/or cobalt.

4. The chemical oxygen generator of claim 2, wherein the at least one layer of the oxygen-generating composition comprises approximately 3.4 to 3.9 percent by weight of the metal powder fuel.

5. The chemical oxygen generator of claim 1, wherein the at least one layer of an oxygen-generating composition further comprises between approximately 0.01 to approximately 0.1 by weight of a transition metal oxide catalyst.

6. The chemical oxygen generator of claim 5, wherein the transition metal oxide catalyst comprises cobalt oxide, manganese oxide, and/or iron oxide.

7. The chemical oxygen generator of claim 1, wherein the at least one layer of the oxygen-generating composition comprises an additive, wherein the additive comprises feldspar and/or anhydrous aluminum silicate.

8. The chemical oxygen generator of claim 1, wherein the oxygen source comprises alkali metal chlorates, and/or alkali metal perchlorates, wherein the at least one layer further comprises a binder comprising amorphous silicon dioxide, and/or mica, and a reaction moderator comprising potassium permanganate, potassium hydroxide, mica, and/or amorphous silicon dioxide.

9. The chemical oxygen generator of claim 1, wherein the perforated metal covering comprises a stepwise, linear, or polynomic-functional increasing opening ratio along the length of the chemical oxygen core.

10. The chemical oxygen generator of claim 1, wherein the perforated metal covering comprises a nickel-chrome alloy and/or stainless steel.

11. The chemical oxygen generator of claim 1, wherein the perforated metal covering comprises at least one end portion and a body portion adjacent to the at least one end portion, and wherein the at least one end portion comprises an opening ratio that is less than the opening ratio of the body portion.

12. The chemical oxygen generator of claim 11, wherein the at least one end portion comprises an opening ratio of 0 percent.

13. The chemical oxygen generator of claim 11, wherein the at least one end portion comprises two end portions, and wherein the body portion is between the two end portions.

14. The chemical oxygen generator of claim 1, wherein the perforated metal covering includes a heat conductivity that is configured to increase a duration of thermal decomposition of the chemical oxygen core.

15. The chemical oxygen generator of claim 1, wherein the perforated metal covering includes a heat conductivity that is configured to preheat the chemical oxygen core prior to thermal decomposition of the chemical oxygen core.

16. The chemical oxygen generator of claim 1, wherein the perforated metal covering is configured to retain heat generated by thermal decomposition of the chemical oxygen core to increase a burn front temperature.

* * * * *